A. L. KIRKWOOD.
COMBINATION MOTION PICTURE AND SOUND REPRODUCING MECHANISM.
APPLICATION FILED APR. 11, 1916.
1,268,729.
Patented June 4, 1918.
3 SHEETS—SHEET 1.
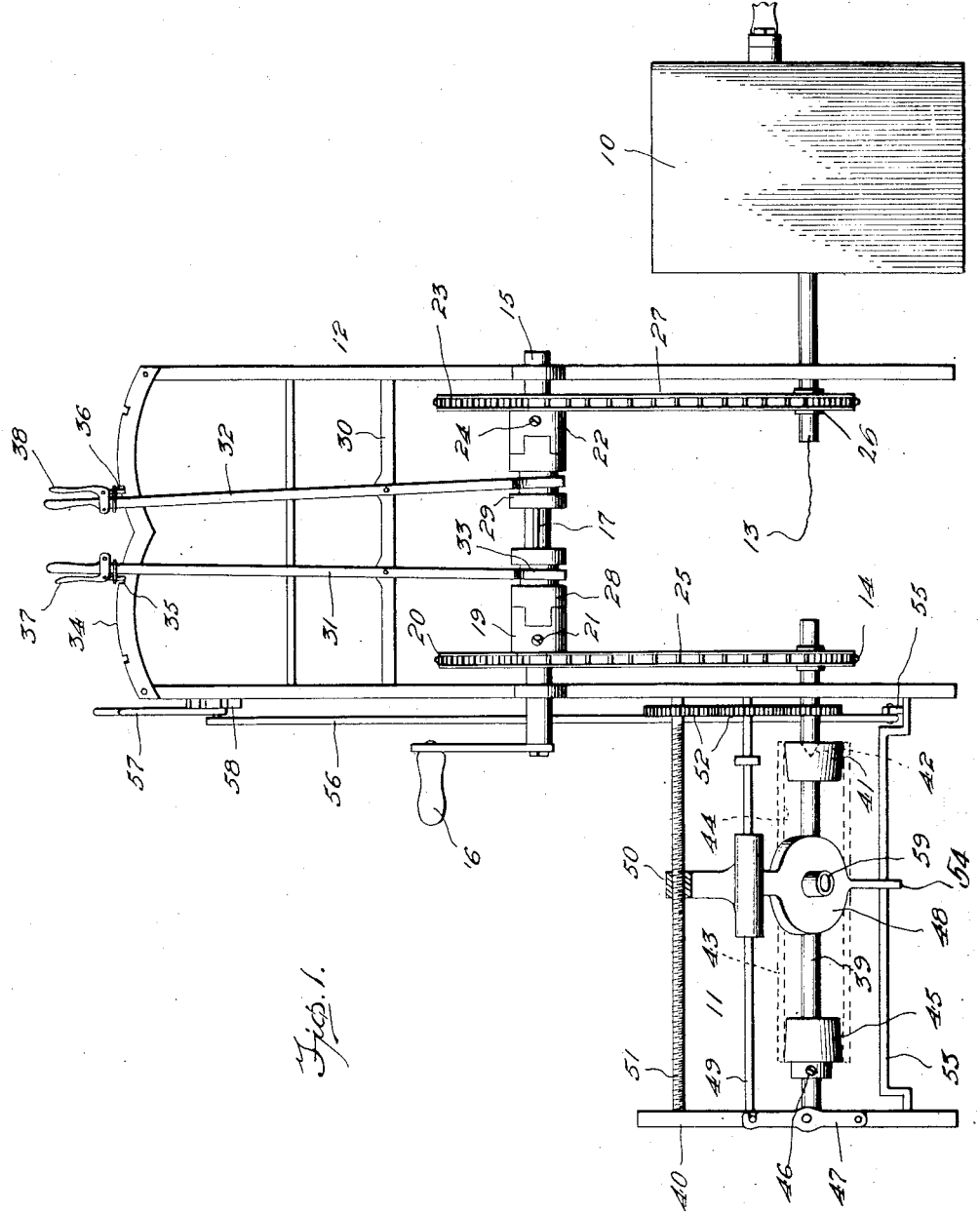
Witnesses
Paul M. Hunt
Nancy A. Minnett
Inventor
A. L. Kirkwood.
By David P. Moore
Attorney A. L. KIRKWOOD.
COMBINATION MOTION PICTURE AND SOUND REPRODUCING MECHANISM.
APPLICATION FILED APR. 11, 1916.
1,268,729.
Patented June 4, 1918.
3 SHEETS—SHEET 2.
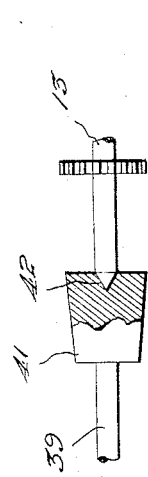
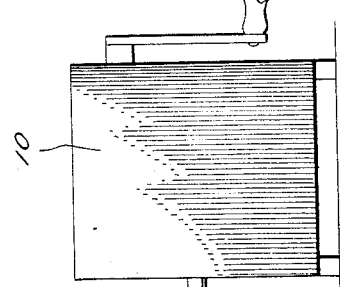
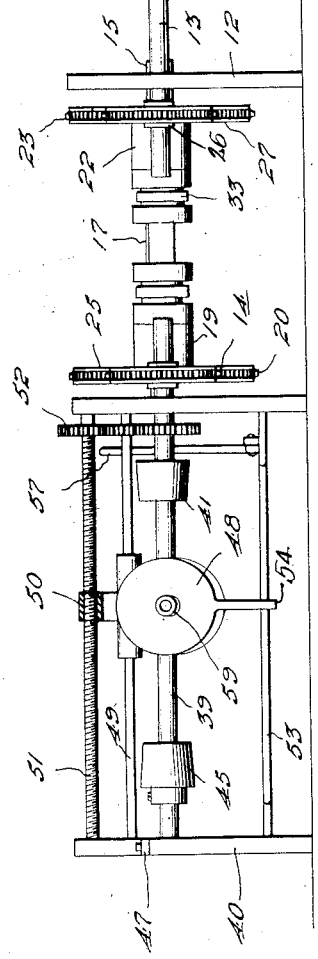
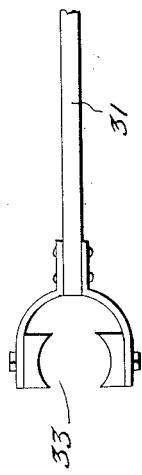
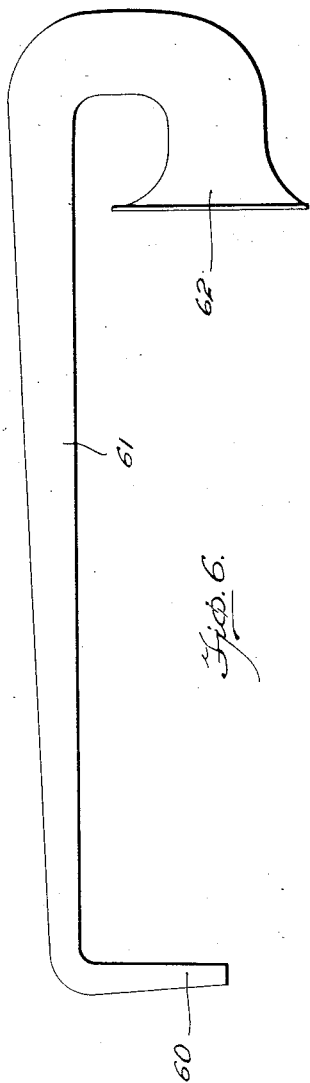
Inventor
A. L. Kirkwood
Witnesses
Paul M. Hunt
Nancy A. Minnett
By David P. Moore
Attorney

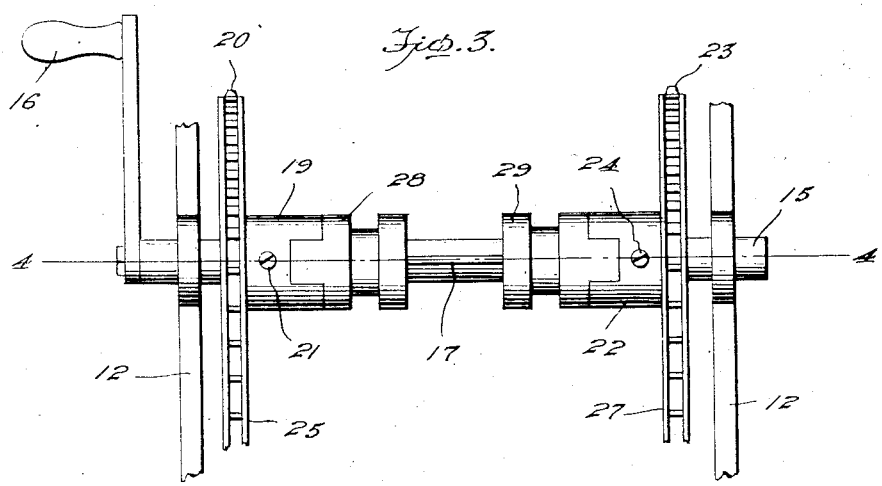
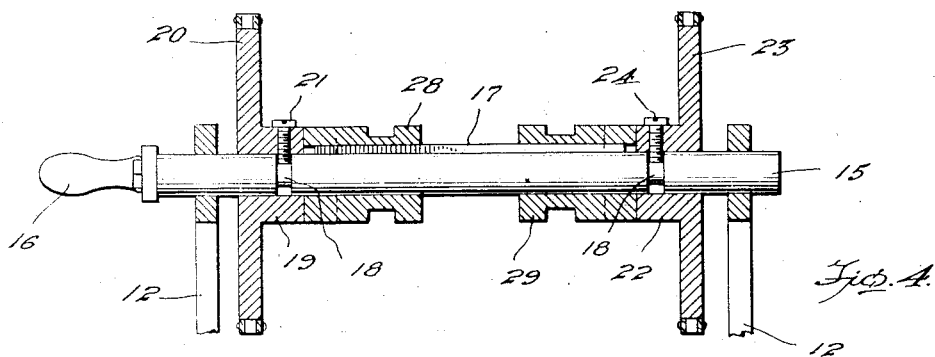
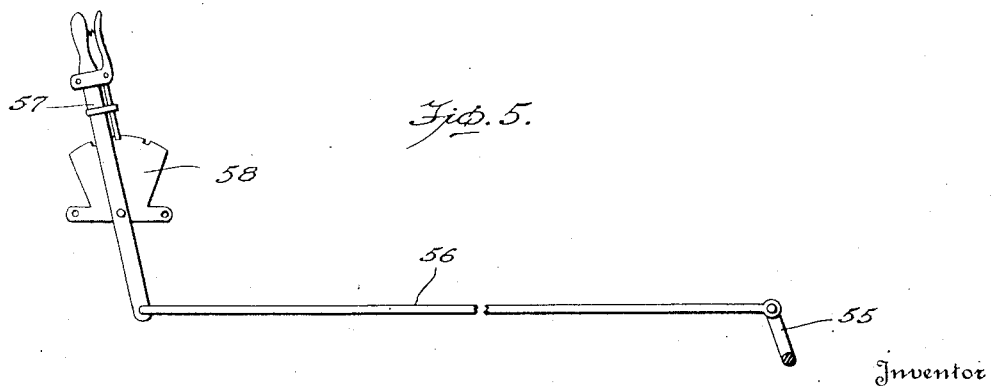

UNITED STATES PATENT OFFICE.

ABRAHAM L. KIRKWOOD, OF BLOCKER, TEXAS.

COMBINATION MOTION-PICTURE AND SOUND-REPRODUCING MECHANISM.

1,268,729.                    Specification of Letters Patent.    Patented June 4, 1918.

Application filed April 11, 1916.  Serial No. 90,382.

*To all whom it may concern:*

Be it known that I, ABRAHAM L. KIRKWOOD, a citizen of the United States, residing at Blocker, in the county of Harrison and State of Texas, have invented certain new and useful Improvements in Combination Motion-Picture and Sound-Reproducing Mechanisms, of which the following is a specification.
This invention relates to improvements in motion picture and sound reproducing mechanisms, one object of the invention being the provision of a connecting mechanism between the two that will operate them in consonance, but should either get out of step, there is provided manually operable means for halting one until the other has caught up.

A further object of the present invention is the provision of a driving mechanism for connection to a motion picture projector and a sound reproducing machine, the same being provided with selectively controlled clutches whereby either machine may be cut out to permit the other to catch up, and thus maintain synchronous action between such machines.

A still further object of the present invention is the provision of a simple mechanism that can be interposed between a motion picture projector and a sound reproducing machine, so that both can be operated to synchronously project the scenes and reproduce sound.
With the foregoing and other objects in view and which will be apparent as the description proceeds, the invention resides in the peculiar arrangement and combination of parts hereinafter set forth, the invention being limited in scope only by what is claimed.

In the accompanying drawings:

Figure 1 is a top plan view of a motion picture projector and a sound reproducing mechanism connected by the operating mechanism.

Fig. 2 is a front elevation of the same.

Fig. 3 is an enlarged plan view of the connecting mechanism between the motion picture projector and sound reproducing machine.

Fig. 4 is a section on line 4—4 of Fig. 3.

Fig. 5 is a detail view of the sound box elevating mechanism.
Fig. 6 is a plan view of a sound duct.

Figs. 7 and 8 are detail views of various parts of the connecting mechanism.

Referring to the drawings, the numeral 10 designates the motion picture projector, which may be taken indicative of any construction of projector now in use, while 11 designates a sound reproducing machine, here shown as a cylinder type, although it is to be understood that a disk machine may be employed.

Mounted between the two machines is a frame 12, which has journaled therein the shaft 39, carrying a sprocket 14, these being the driving connections for the machine 11. Journaled in the frame 12 is a shaft 15, which is here shown as being driven by a hand crank 16, although it is to be understood that a motor may also be employed, where found desirable. This shaft is provided with a longitudinal key 17 and the two reduced portions 18, the sleeve 19 carrying the large sprocket 20, through the screw pin 21 being connected for free rotation upon the shaft 15 but held from longitudinal movement, while the sleeve 22 carrying the large sprocket 23, through the screw pin 24 engages the remaining recess or reduced portion 18 in a similar manner. The sprocket 20 is connected to the sprocket 14 by a chain 25, while the sprocket 23 is connected to the drive sprocket 26 of the projector 10 by means of the chain 27.

Each sleeve 19 and 22 constitutes a clutch member, for coöperation with the respective spool clutch members 28 and 29, which are carried upon the shaft 15 and are made to rotate therewith by means of the key 17. Thus when both clutches are connected, and the shaft 15 is rotated both machines 10 and 11 are operated in unison.

The two clutches are provided in order that should the machines 10 and 11 get out of step, the machine that is ahead, may be temporarily disconnected through its clutch, until the other machine has caught up, at which time the clutch could be thrown in and thus both machines be again operated in synchronism.

In order that the two clutches may be manually controlled, there is mounted in the frame, a bar 30, to which is pivoted both operating levers 31 and 32, the forked ends 33 thereof fitting upon the spool clutch members 28 and 29. Carried by the frame is the double segment 34, for coöperation with the detents 35 and 36, carried at the handle ends of the two respective levers. The spring actuated trigger lever 37 or 38 is mounted upon its respective handle and controls its detent or bolt. Thus the clutch members 28 and 29 may be engaged or disengaged, and be locked in either position.

The sound reproducing machine here illustrated, is provided with the shaft 39, and fixed upon said shaft with the frame 40, is a cone 41, having the lug point 42, so that a cylinder record 43 provided with a recess 44 may be properly positioned, the other cone 45, being adjustably mounted through the medium of the screw 46, so that various lengths of records may be accommodated. The pivoted bearing member 47, permits the removal of the cone 45, when introducing or removing a record. The sound box 48 is mounted upon the guide rod 49 for sliding and swinging movements, and has its feed screw engaging member 50 disposed for engagement or disengagement with the feed screw 51, which is operated through the train of gears 52 from the shaft 39.

In order that the sound box may be elevated to disengage the record and also the feed screw when returning it or inserting a new record, the crank shaft 53 has its respective ends journaled in the main frame and in the frame of the sound reproducing machine so that its crank portion is operably connected to the finger 54 of the sound box. A pin 55 projects from the shaft 53, and in turn is connected through the long rod 56 to the operating hand lever 57. This lever is in ready access to the operator, so that the lever may be operated, and through the pawl and segment 58 lock the sound box in either position.

The sound box for this purpose is to be larger, and to its sound duct 59, is detachably connected the hook end 60 of the sound amplifying horn 61, whose enlarged end 62 is bent to convey the sound in the desired direction.

From the foregoing description it will be noted that all of the operating levers are in ready access to the operator, and that by this mechanism the motion picture projector and sound reproducing machine may be operated in synchronism.

Where desirable, the shaft 13 may be extended to operate two instead of one sound reproducer mechanism or in fact any sound making device.

What I claim, as new, is:—

1. The combination with the operating shaft of a motion picture projector and the operating shaft of a sound reproducing machine, of a main frame having the operating shafts journaled therein, a main drive shaft journaled in the main frame, sprocket wheels loosely mounted on the main drive shaft, stationary clutch members carried by the sprocket wheels, other sprocket wheels on the operating shafts, chains operating about the sprocket wheels for transmitting motion from the main drive shaft to the motion picture projector and to the sound reproducing machine, movable clutch members slidably mounted on the main drive shaft and arranged to engage the corresponding stationary clutch members, levers pivotally mounted on the main frame and having their yoked ends operatively arranged about the movable clutch members whereby both of the machines may be operated in unison or independently of each other, pivotally mounted pawls operatively mounted on the handle ends of the lever and engageable with the frame whereby to consequently hold the movable clutch members in a set position, and means for rotating the main drive shaft.

2. The combination with a motion picture projector and a sound reproducing machine, a main frame, a main driving shaft journaled in the frame, independent transmission mechanisms between the main driving shaft and the motion picture projector and the sound reproducing machine, selectively operable clutches on the main driving shaft, levers operably connected to the clutches and positioned near one end of the main frame whereby both the sound reproducing machine and the motion picture projector may be operated in unison or independently of each other, a crank shaft rockably mounted with respect to the main frame and operably connected to the sound box of the sound reproducing machine, a pin projecting from the rockably mounted shaft, a rod connected at one end of the pin, another lever pivotally mounted on the main frame near the aforementioned levers and connected to the other end of the rod whereby the sound box may be disengaged preparatory to the actuation of the lever for disconnecting the sound reproducing machine from the main shaft so that the sound reproducing machine will be stopped without loss of any part of the record thereof.

3. The combination with the operating shaft of a motion picture projector, and a sound reproducing machine including a frame, and operating shaft journaled therein, a record cylinder engageable with the operating shaft, a sound reproducer pivotally and slidably mounted on the frame and engageable with the record cylinder, another shaft operably connected to the operating shaft of the sound reproducing machine and having the sound reproducer operably connected thereto, of a main supporting frame having the operating shafts of the respective machines journaled therein, a main driving shaft journaled in the main frame, independent transmission mechanisms between the main driving shaft and the operating shafts to the respective machines, selectively operating clutches on the main driving shaft, levers pivotally mounted near one end of the main frame and connected to the clutches whereby both machines may be operated in unison or independently of each other, a rockably mounted crank shaft in the main frame and in the frame of the sound reproducing machine and connected to the sound reproducer, another lever mounted on the main frame near the first mentioned levers and connected to the rockably mounted shaft so as to disengage the sound reproducer preparatory to the actuation of the lever for disconnecting the sound reproducing machine from the main driving shaft to consequently stop the sound reproducing machine without loss of any part of the record cylinder.

In testimony whereof I affix my signature.

ABRAHAM L. KIRKWOOD.